United States Patent [19]

Lang

[11] 4,027,250
[45] May 31, 1977

[54] APPARATUS AND METHOD FOR REDUCING EFFECTS OF AMPLITUDE AND PHASE JITTER

[76] Inventor: Gordon R. Lang, R.R. 1, Bolton, Ontario, Canada, L0P 1A0

[22] Filed: Oct. 21, 1975

[21] Appl. No.: 624,384

[52] U.S. Cl. .............................. 325/323; 178/88; 325/42; 325/473
[51] Int. Cl.² .......................................... H04B 1/10
[58] Field of Search ............... 325/41, 42, 65, 320, 325/322–326, 473–476, 67.30; 178/67.88

[56] References Cited

UNITED STATES PATENTS

| | | | |
|---|---|---|---|
| 3,407,355 | 10/1968 | Clark et al. | 325/67 |
| 3,644,830 | 2/1972 | Ragsdale | 325/42 |
| 3,800,228 | 3/1974 | Acker | 325/323 |
| 3,878,468 | 4/1975 | Falconer et al. | 325/42 |

Primary Examiner—Robert L. Griffin
Assistant Examiner—Jin F. Ng

[57] ABSTRACT

Means and method are provided for correcting for the effects of amplitude and phase jitter, in the presence of noise on quadrature signals transmitted over a channel at regular intervals as quadrature pairs. The signal values of respective signal elements of sequentially transmitted quadrature pairs, as received are measured. Responsive to such measurement a first decision is made as to which pair of quadrature signals was transmitted. The measured value and value from the first decision for the same signal are compared for each signal and as a result of such comparison measures of the amplitude and phase errors occurring during transmission. The measures of amplitude and of phase errors are averaged over respective pluralities of intervals. The measured signal values are transmitted over a line and modified to compensate for the average values of the phase errors and of the amplitude errors. The signal values so modified are used as the basis of a second decision as to the elements modified.

10 Claims, 6 Drawing Figures

APPARATUS AND METHOD FOR REDUCING EFFECTS OF AMPLITUDE AND PHASE JITTER

This invention relates to means and a method for correcting for disturbances affecting the values of signals transmitted at predetermined intervals in quadrature pairs.

This invention applies to double sideband quadrature carrier modulation systems used for data transmission in which data signals are represented at regular intervals (bauds) in terms of pairs of values used to modulate the two transmitting carriers.

The possible transmitted signals are often represented in a geometric X-Y plane as a set of discrete signal points with typical coordinates ($X_T$, $Y_T$). Synchronous demodulation of each quadrature carrier provides, at regular baud intervals, signal pairs, herein denoted as ($X_m$, $Y_m$), which may differ from the corresponding transmitted pairs ($X_T$, $Y_T$) due to transmissions disturbances and other factors. U.S. Pat. No. 3,887,768 suggests means for selection of 'good' signal sets corresponding to our ($X_T$, $Y_T$) for a quadrature data communication system. A McGraw-Hill Book entitled "Principles of Data Communication" by Lucky, Salz and Weldon provides on page 177 and page 178 a useful description of quadrature modulation and an example on pages 193, 194 and 195. This book also contains useful information on the equalization of such systems.

The disturbances that are considered include: noise, amplitude jitter and phase jitter. Noise has a random effect upon the amplitude or phase of a signal. Amplitude jitter and phase jitter are disturbances affecting the signal on a channel and affecting largely only the amplitude or phase of the quadrature pairs.

The means and method here described are found to reduce in certain defined situations the errors in decision at the receiving end as to what elements have been transmitted. The situations where such improvement has most often been found, are those in which the disturbances are the combined effect of noise on the one hand and at least one of amplitude or phase jitter on the other hand. Further no claim is made for improved results where the phase or amplitude error is a constantly increasing or decreasing one — that is which is often known as a 'ramp' disturbance. The effect of such constantly increasing or decreasing disturbances may be corrected by such well known techniques as negative feedback.

It is an object of the invention to provide means and a method of reducing the effects of the disturbances, before mentioned, where the circuitry measures the values of received quadrature pairs and makes a first or preliminary decision as to the value of the corresponding transmitted elements. The apparatus is designed, through comparison of the measured values and the first decision values to make an assessment of the phase angle change and the magnitude change occurring in transmission by considering the quadrature pairs as X and Y coordinates. Such changes are treated as if caused by noise and by amplitude and/or phase jitter. The apparatus is designed to average the assessed phase angle changes for a predetermined succession of intervals (or pairs of message elements) and to average the assessed amplitude change for a predetermined succession of intervals (or pairs of message elements), which may or may not be the same number of intervals as used in the phase averaging.

The averaging processes are designed (and the numbers of intervals over which averaging is performed) are selected to substantially reduce the effects of noise in the averaged phase angle change and averaged amplitude change results. Although research in these areas falls far short of exhaustive, the spectral frequency range for phase jitter and for amplitude jitter may in many cases be different and each be different from the spectral frequency range for noise. Accordingly the averaging time for the phase and amplitude changes may be different.

The resultant averaged phase change (here designated $\bar{\theta}$) is used to provide a corresponding phase correction on the measured received element values. The corrective apparatus is designed to perform operations physically approximating the formulae $$X_m' = X_m \cos \bar{\theta} - Y_m \sin \bar{\theta}$$

$$Y_m' = Y_m \cos \bar{\theta} + X_m \sin \bar{\theta}$$

where $X_m$, $Y_m$ are the measured values of a quadrature pair having a selected time relative to the averaging interval and $X_m'$, $Y_m'$ are the corresponding phase corrected values. The extent to which the approximation should approach the true mathematical formulae will be described hereinafter. The averaged amplitude change $\bar{g}$ implies the application of a corrective multiplier $1/\bar{g}$. The result of correction of the measured elements $X_m$, $Y_m$ for both amplitude and phase are designated $X_m''$, $Y_m''$. It will be noted the modification involved in the multiplication $1/\bar{g}$ may be performed before, during or after the phase modification.

The measured signal results, $X_m$, $Y_m$ to be modified in accord with the phase and angle decisions are delayed before such modification to provide, that to the extent desired, the modification occurs due to the phase and amplitude measurements made during, before and after the particular measured signal to be modified. Thus if at a given time T25 (the end of the 25th interval) the phase signals averaged for the phase measurement are from T15 to T35, and those averaged for the amplitude measurement are T10 to T40, then, as an example, these averages can be used to correct the signal elements corresponding to T25. On this basis the measured values $X_m25$, $Y_m25$ are modified by averages for phase taken over the interval from T15 to T35 and for amplitude taken over interval from T10–T40. In this example the measured signals would be delayed 10 intervals before being corrected in accord with the phase measurement and then be delayed an additional five intervals before correction in accord with the amplitude measurement. Thus the delayed measured signal value at T25 is modified by averages which include not only signals which have occurred before T25 but those which have occurred after. The circuitry is designed so that the averages are running averages, and the corrections are applied at every interval, thus when the measured signals $X_m26$, $Y_m26$ appear for modification they are modified in accord with the amplitude average from T16 to T36 and from T11 to T41.

In the example given and in the equipment to be described the signals modified in accord with an averaged result are those corresponding to the middle time of the averaging interval it must be appreciated that this is a preferred form of the invention. In its broader aspects, the invention contemplates that the averaged result may be used to correct or modify quadrature signals occurring other than at the mid-point of the averaging interval. If the quadrature signals modified occur before or after the mid-point of the averaging intervals then the average has been used to take into account more of the 'past' or the 'future' (respectively) disturbances of signals.

The averaging processes to obtain an averaged phase change and amplitude change on the channel may be averaged by applying equal weight to the results over a finite interval as implied by the procedures discussed in the paragraph commencing at line 5 of page 3. However it should be noted that the average may be calculated in such a way as to give more weight to decisions based on message elements received with a small time separation from the message element being modified than the weight given decisions based on message elements farther removed in time. It will also be noted that due to the fact that, within the scope of the invention, the delay which may be applied to the measured elements before modification by the averaged results means that these results may cover occurrences occurring in the "future" as well as the "past" so far as the message element being modified is concerned. Thus weighted averages, if desired may be weighted not only in favour of the "near" over the remote "past" but also in favour of the "near" over the remote "future". The averaging procedure may in fact use any weighting which is found most suitable to the channel over which transmission is taking place and to the desirable design of equipment for obtaining and using the average. Although the examples given earlier and later herein deal with averaging over a finite time, averaging may also be used which applies at least some weight to decisions made from the starting of the operation, so that the averaging period can be considered as increasing as the operation proceeds. The flexibility in the weighting and the relative timing of averaging is also discussed again at the end of the disclosure. the term 'average', 'averaged' or 'averaging' used in the disclosure and claims include the alternatives discussed above.

The signals $X_m''$, $Y_m''$ which are the measured signal values modified for amplitude and phase, are then subjected to a second descision making process as if the signals $X_m''$, $Y_m''$ were the signal received from the line. It is found that where the channel was such as to cause errors which were a combination of noise and either amplitude or phase jitter or both and possibly in some cases where noise may not be completely random, the second decision values $X_{D2}$, $Y_{D2}$ correspond to the transmitted values $X_T$, $Y_T$ with a much smaller error rate than do the values $X_D$, $Y_D$ determined by the first decision. The first decision values correspond to those obtained by the processes of the prior art.

The phase angle correction ideally is performed in accord with the formulae:

$$X_m' = X_m \cos \overline{\theta} - Y_m \sin \overline{\theta}$$

$$Y_m' = Y_m \cos \overline{\theta} + X_m \sin \overline{\theta}$$

where $X_m$ is the measured value of one of the paired quadrature elements and $Y_m$ is measured value of the other,
and $\overline{\theta}$ is the averaged phase angle shift from $X_m$, $Y_m$ to $X_D$, $Y_D$.

It will be appreciated that the amplitude correction $1/\overline{g}$ where $\overline{g}$ is the averaged amplitude change, may be applied before, during or after the phase correction so that the result will be that the signals for the second decision process will be:

$$X_m'' = 1/\overline{g}\, X_m \cos \overline{\theta} - 1/\overline{g}\, Y_m \sin \overline{\theta}$$

$$Y_m'' = 1/\overline{g}\, Y_m \cos \overline{\theta} + 1/\overline{g}\, X_m \sin \overline{\theta}$$

The formulae (1) and (2) need not be physically embodied with strict mathematical accuracy and approximations may be used in the physical processes which are suitable to equipment design, in the light of known characteristics of the particular class of channel and/or the application involved.

Thus if $\theta$ is small, $\tan \theta$ may be used where $\sin \theta$ is indicated in the formulae, with results improved over a one decision process and $1 - (\tan^2 \theta/2)$ may be substituted for $\cos \theta$.

In drawings which illustrate a preferred embodiment of the invention:

Figure 1:
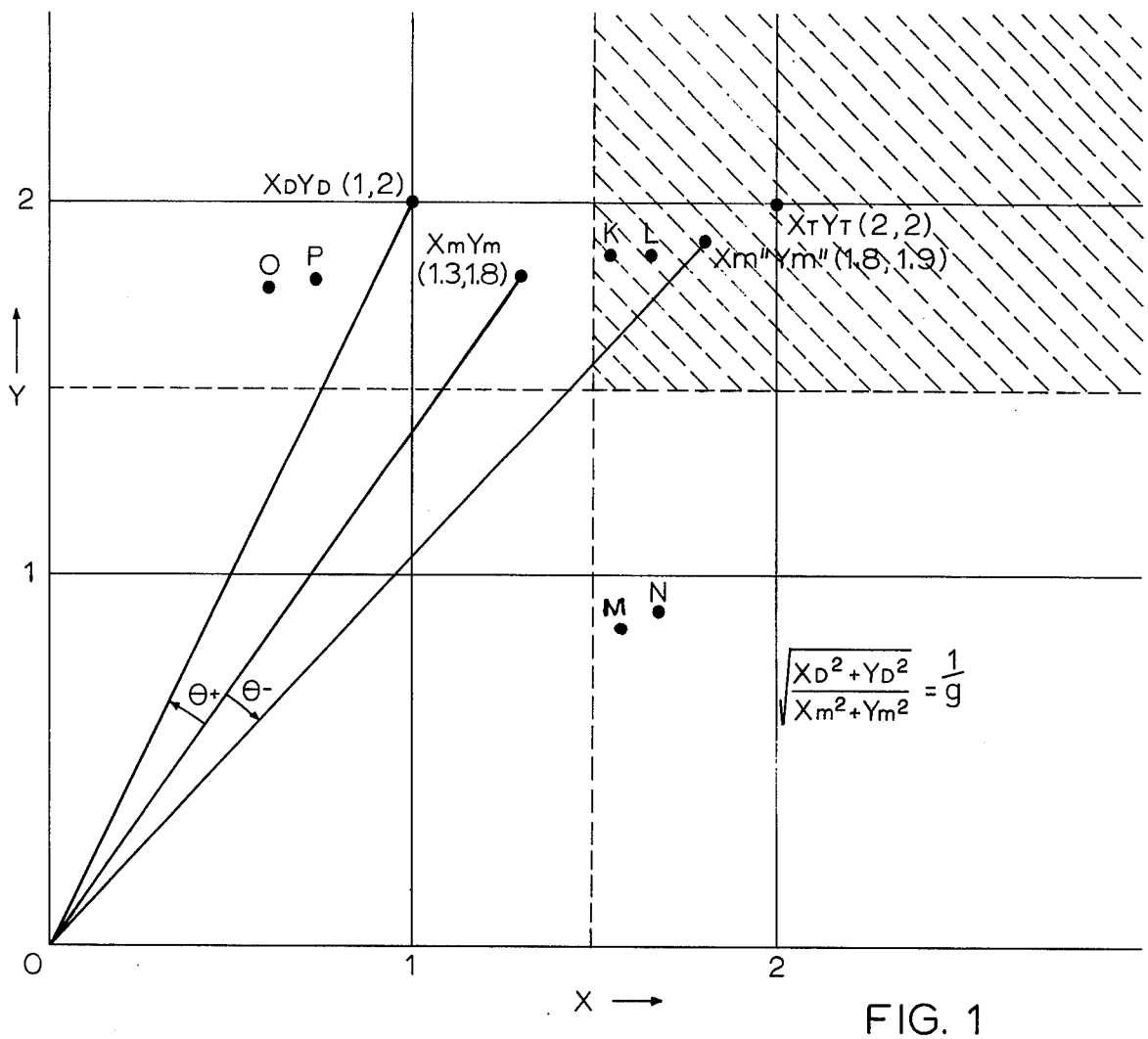
FIG. 1 shows quadrature message elements plotted as cartesian coordinates.

FIG. 1 is inserted only as explanatory of some of the terms and theory of the invention. FIG. 1 assumes (for simplicity only) a four character code wherein the possible values of the transmitted quadrature elements are $X_T$, $Y_T$ (1,1) (1,2) (2,1) or (2,2). FIG. 1 shows a character from this code $X_T Y_T = (2,2)$. FIG. 1 shows exemplary measured received values, $X_m Y_m$ after transmission over a channel, (1.3, 1.8). The shaded area shows the region where the first decision making process will decide that the transmitted values were most likely $X_D Y_D$ (2,2). From the relative angles between the values $X_m Y_m$ and $X_D Y_D$ the probable phase displacement $\theta$ may be determined and from the distance between the origin and the points the amplitude factor $g$ may be determined. It is in many cases found easier to calculate $\Delta$, the increment of the correction factor where $1/g = 1 + \Delta$. $\Delta$, the incremental addition is generally more easy to calculate accurately than $1/g$ and further lends itself to approximation by formulae which allow easier calculation than the calculation of $1/g$.

Thus with the received values $X_m Y_m$ (1.3, 1.8) the first decision device will decide that the transmitted value is $X_D Y_D$ (1.2). The resultant calculation that the phase correction should be counterclockwise, shown as positive on the drawing, and the amplitude correction very small would be incorrect. However where noise contributed to the indicated disturbance of the signal, the noise will tend to be random and will not affect the signal in the same way. Thus points K, L, M represent the position corresponding to quadrature pairs transmitted just before the signal $X_m Y_m$ and points N, O, P represent quadrature pairs transmitted just after. The points K — P correspond to transmitted values as follows:

| POINT | TRANSMITTED PAIR $X_T$ | $Y_T$ | FIRST DECISION VALUES $X_D$ | $Y_D$ | INDICATED $\theta$ CORRECTION | INDICATED $1/g$ |
|---|---|---|---|---|---|---|
| K | 2 | 2 | 2 | 2 | Clockwise | >1 |
| L | 2 | 2 | 2 | 2 | " | " |
| M | 2 | 1 | 2 | 1 | " | " |
| N | 2 | 1 | 2 | 1 | " | " |
| O | 1 | 2 | 1 | 2 | " | " |
| P | 1 | 2 | 1 | 2 | " | " |

As will be obvious from the diagram the decision values for each of the quadrature pairs K − P will correspond to the values transmitted and the resultant indicated phase ($\theta$) and $1/g$ corrections will be in the correct sense. (The assumption has been, therefore, that the noise which affected signals $X_m$, $Y_m$ has not affected pairs K−P).

Since all the indicated corrections of phase $\theta$ for pairs K − P are clockwise it will be obvious that the average correction $\bar{\theta}$ obtained by the equipment described herein, obtained by averaging both the results from pairs K − P and the results from the pair $X_m$ $Y_m$ will be clockwise. Similarly the results from averaging the values of $1/g$ (or of $g$) for pairs $X_m$ $Y_m$ and K − P will provide a correction $\overline{1/g}$ greater than 1, hence the corrections $\bar{\theta}$, $\overline{1/g}$ applied to $X_m$ $Y_m$ will produce the points $X_m''$, $Y_m''$ displaced from $X_m$ $Y_m$ in a direction toward the point 2,2 and inside the shaded zone where the second decision device will decide that the pair 2,2 has been sent. Thus the averaging process effectively obviates the fact that the $\theta$ and $g$ corrections indicated by the decision pair $X_D$ $Y_D$ (1,2) are not correct.

As FIG. 1 shows the resultant magnitude of the first decision value of the pairs $X_m$ $Y_m$ is $\sqrt{X_D^2 + Y_D^2}$ (a) and the resultant value of the magnitude of the measured value of the same pair is $\sqrt{X_m^2 + Y_m^2}$ (b). Thus the ratio of (b) to (a) is the measure of the gain $g$ contributed by the disturbance on the channel, and the inverse of this $$\sqrt{\frac{X_D^2 + Y_D^2}{X_m^2 + Y_m^2}} = \frac{1}{g}$$

is the estimate (based on one received pair of signals) of the value of the correction to amplitude required.

Figure 2:
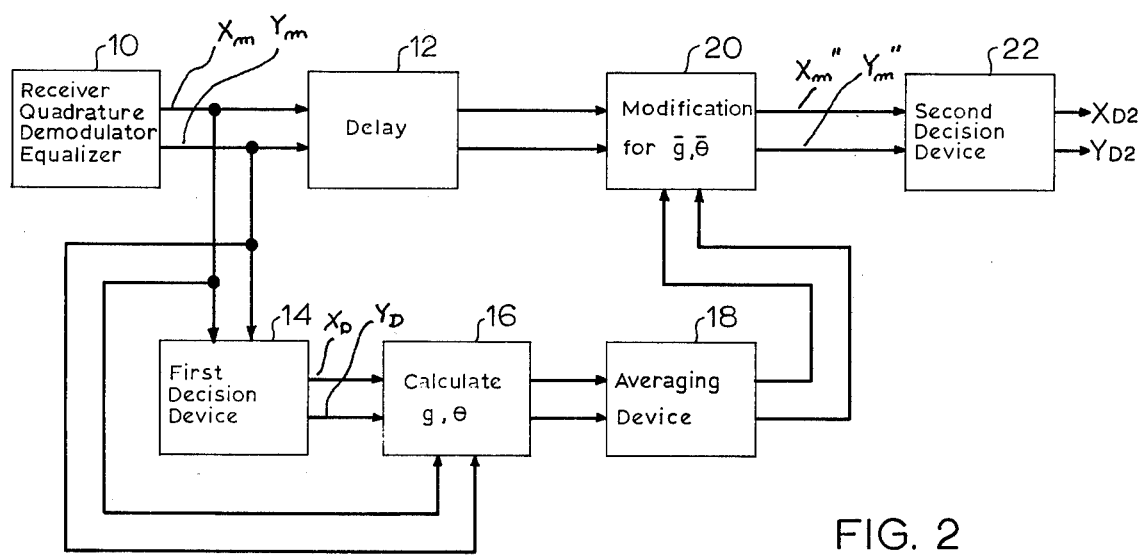
FIG. 2 shows a preferred circuit for carrying into effect the invention.

FIG. 2 demonstrates the overall scheme of the method and means of the invention. As indicated, pairs of demodulated quadrature elements $X_m$, $Y_m$ are provided at each baud interval from the Receiver where the quadrature elements are demodulated and equalization procedures may be performed. The elements $X_m$, $Y_m$ are the measured results of the modulation at a transmitter on a carrier of corresponding elements $X_T$ and $Y_T$, the transmission of the latter elements on a channel, the disturbance of such elements by noise, amplitude jitter and phase jitter and the demodulation equalization and measurement at the receiver into the quadrature elements by conventional devices, well known to those skilled in the art.

At each baud interval a new pair of such measured elements $X_m$ and $Y_m$ will be detected.

The detected elements $X_m$ and $Y_m$ are set along three paths, firstly to a Delay to be discussed hereinafter and secondly to a First Decision Device 14. The First Decision Device may be designed to operate in any of a number of ways well known to those skilled in the art, designed to decide from the measured values $X_m$ $Y_m$ which of the possible transmitted values of $X_T$ and $Y_T$ approach most closely to the measured values $X_m$ and $Y_m$. The values of $X_T$ and $Y_T$ selected by the decision device are designated $X_D$ and $Y_D$ to distinguish them from the actual transmitted values $X_T$ and $Y_T$, with which, in the conditions requiring this invention, they will not always agree.

The values $X_D$ and $Y_D$ are sent along separate lines to calculating means 16 which also receives the values $X_m$ and $Y_m$. These values are used at calculating means 16 to calculate measures of the amplitude multiplication factor $g$ (or $\Delta$ where $1/g = 1 + \Delta$) and measures of the change of phase angle $\theta$ affecting the transmissions over the channel. These procedures are performed sequentially for the quadrature pairs $X_m$ $Y_m$ sequentially appearing at each baud interval. The averaging device 18 is designed to average the values for $g$ (or measures thereof) and $\theta$ (or measures thereof), over a predetermined number of baud intervals. The number of intervals over which averaging takes place will be selected having regard to the assumed or known characteristics of the channel. The averaging period may be different for the amplitude and for the phase measures. The averaging device is designed so that it provides a running average, that is for each successive baud interval the average whether of amplitude of phase becomes an average over a set of baud intervals each, one baud later than before.

Where the average is a weighted average each weight is, with each successive interval, applied to a decision result on later than before. Where the average includes decisions going back to a starting time as opposed to an average over a fixed number of baud intervals, the average over successive intervals will continue to include decisions from the starting time but the weighting will alter with each interval that passes.

The signal from the averaging device is applied at 20 to modify the delayed elements $X_m$ $Y_m$ from delay 12. The modifying device 20 thus modifies the signals $X_m$ (delayed), $Y_m$ (delayed) in accord with the averaging $\bar{\theta}$ and $\bar{g}$. As will be obvious, the modifying device 20 modifies signals $X_m$, $Y_m$ delayed to correspond to a time having a predetermined relationship to the averaging interval. The signal modified in accord with the phase angle and amplitude determinations is subjected to a second decision making process similar to the first, at decision device 22. However it is often found that the decisions resulting from the second decision making step are much more accurate than those of the first decision making step.

The effects of noise are substantially reduced by the averaging process so that the phase and amplitude correction are designed to compensate primarily for amplitude and phase jitter.

Figure 3:
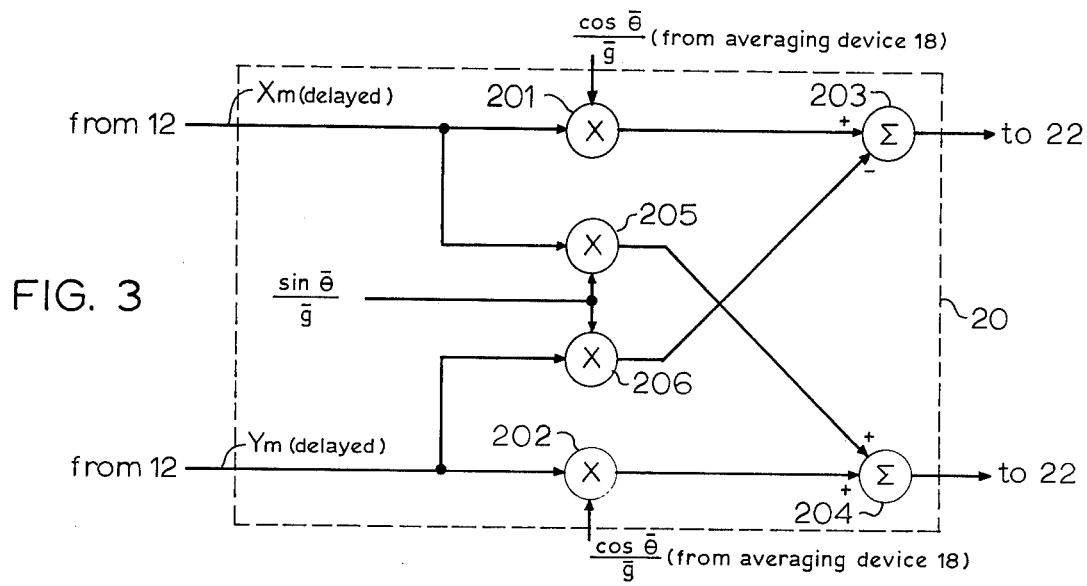
FIGS. 3 and 4 show circuits for correcting for a known amplitude and phase disturbance.

FIG. 3 shows a circuit designed to correct for an amplitude jitter multiplier $\bar{g}$ and for an average phase change $\bar{\theta}$.

As shown in FIG. 3 the delayed signals $X_m$ and $Y_m$ are respectively supplied to multipliers 201, 202 where they are multiplied, respectively, by values for $\cos \bar{\theta}/\bar{g}$ the outputs are supplied respectively to positive inputs of summers 203 and 204 respectively. The delayed signals $X_m$, $Y_m$ are also supplied to multipliers 205, 206 respectively, where they are multiplied by a factor $\sin \bar{\theta}/\bar{g}$. The output of multiplier 206 is applied negatively to the summer 203. The output of multiplier 205 is applied positively to summer 204. The averaging means 18 is designed to provide to means 20 the values of sin $\overline{\theta/g}$, cos $\overline{\theta/g}$.

The outputs of summers 203 and 204 are provided to second decision means 22 as shown in FIG. 2.

As will be obvious from the circuit, the circuit of FIG. 3 performs the equivalent of a multiplication by $1/\overline{g}$ and a rotation through and angle $\overline{\theta}$ so that the resulting signals $$x_m'' = X_m (\cos \overline{\theta/g}) - Y_m \sin \overline{\theta/g}$$

$$Y_m'' = Y_m (\cos \overline{\theta/g}) + X_m \sin \overline{\theta/g}$$

It will be appreciated that the operation to produce $X_m'$ and $Y_m''$ from $X_m$ and $Y_m$, given $X_m$, $Y_m$ $\overline{\theta}$ and $\overline{g}$ may be performed by circuitry such as that shown or by a calculating device.

Figure 4:
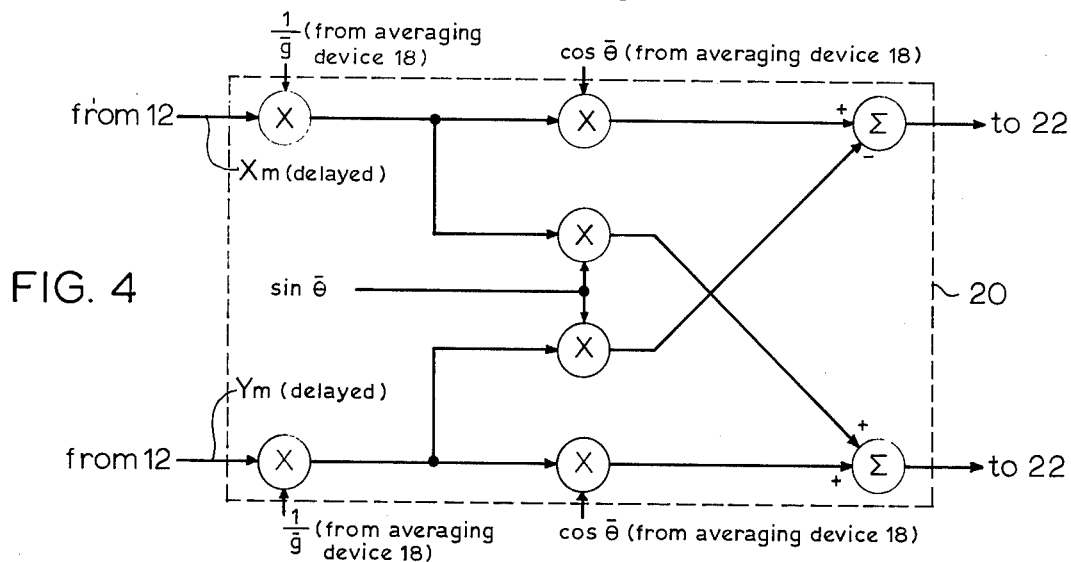

FIG. 4 shows an alternative circuit for obtaining the values $X_m''$ and $Y_m''$ from the signals $X_m$ and $Y_m$.

The operation and arrangement of the elements of FIG. 4 is generally the same as that of the elements of FIG. 3 and the operation of the circuit will therefore easily be understood. In FIG. 4 as distinct from FIG. 3 the multiplication by $1/\overline{g}$ for amplitude correction is performed first and the rotation of axis through the angle $\overline{\theta}$ is performed thereafter.

Although the circuits of FIGS. 3 and 4 show a modification of the elements $X_m$, $Y_m$ through angle $\overline{\theta}$, which is mathematically accurate, it will be noted that where $\overline{\theta}$ is small, some approximations may be made to the formulae outlined above which will simplify the operations being performed.

Thus for $\theta$ less than about 17°, in most applications, $\overline{\tan \theta}$ may be substituted for sin $\overline{\theta}$ and $1 - (\overline{\tan^2 \theta}/2)$ may be substituted for cos $\overline{\theta}$ These substitutions are of practical value since $\overline{\tan \theta}$ is easier to calculate than sin $\overline{\theta}$ or cos $\overline{\theta}$.

tan $\theta$ at any interval may be calculated as:

$$\tan \theta = \frac{X_m Y_D - Y_m X_D}{X_m X_D + Y_m Y_D}$$

More-over $$g = \sqrt{\frac{X_m^2 + Y_m^2}{X_D^2 + Y_D^2}}$$

However it is found in some cases easier to calculate $g$ on the basis $1/g = 1 + \Delta$ where $$\Delta \approx \frac{X_D^2 + Y_D^2 - (X_m^2 + Y_m^2)}{2 (X_D^2 + Y_D^2)}$$

this being one of the approximations of $\Delta$ which is relatively easy to calculate as referred to previously.

Figure 5:
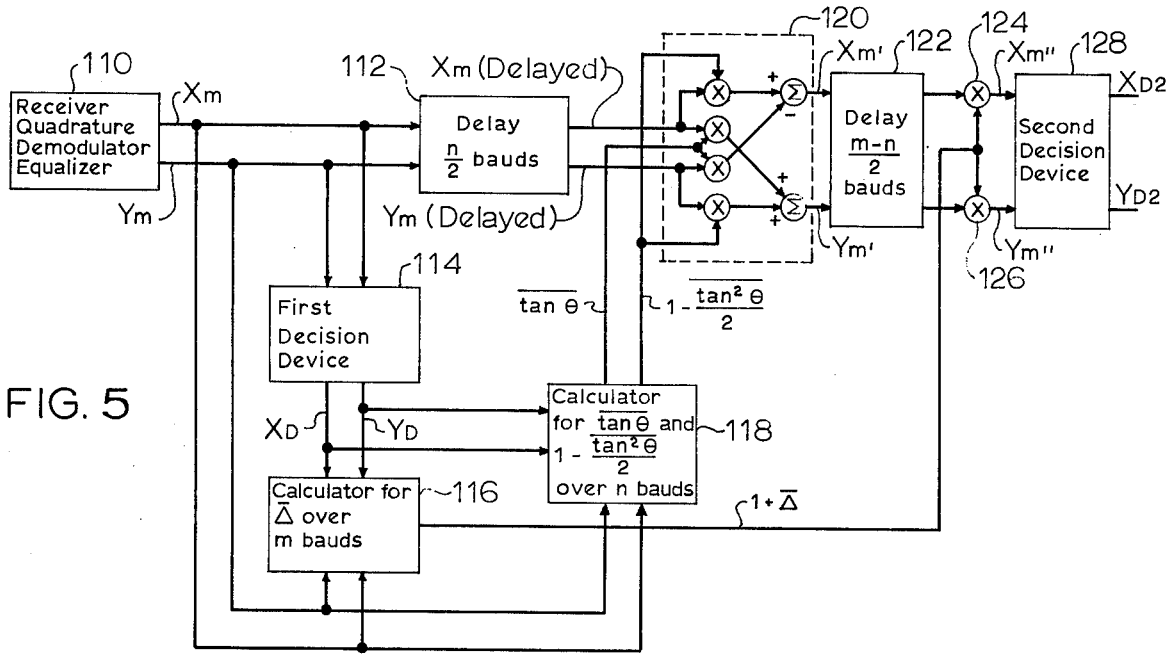
FIG. 5 shows a preferred form of the circuit generally shown in FIG. 2.

FIG. 5 shows circuitry embodying modification of the received measured values in accord with the approximations for sin $\overline{\theta}$ and cos $\overline{\theta}$ and for correction in accord with $\overline{\Delta}$.

In FIG. 5 block 110 indicates schematically as in FIG. 2, the signals $X_m$, $Y_m$ following reception, quadrature demodulation and equalization.

As shown in FIG. 5, the measured values of successive quadrature pairs $X_m$ and $Y_m$ are separately sent through a delay 112 (of $n/2$ bauds where $n$ is even) the delayed pairs $X_m$ and $Y_m$ are provided to the respective inputs of the phase adjusting circuitry 120. The phase adjusting circuitry 120 is designed to operate as the circuitry of either FIGS. 3 or 4 except that phase only, and not amplitude is adjusted. The phase adjusted outputs $X_m'$, $Y_m'$ are respectively delayed at Delay 122 and are delayed by $(m-n)/2$ bauds (where $m$ is even). The delayed signals $X_m'$, $Y_m'$ are respectively applied to the amplitude correction multipliers 124, 126, where they are respectively multiplied by the correction multipliers $1+\Delta$. The outputs of the amplitude correction multipliers $X_m''$, $y_m''$ are applied to the second decision device 128 which is designed to produce therefrom the elements $X_D^2$, $Y_D^2$. The elements $X_{D2}$ and $Y_{D2}$ are, in accord with the objects of the invention appraisals of the transmitted elements with an error rate much smaller than the error rate for the elements $X_D$, $Y_D$ obtained from the first decision device 114 which represents the results obtainable with the prior art.

The measured received values are supplied to the first decision device 114 which operates in the same manner to the first decision device 14 of FIG. 2. The outputs of the first decision device are the elements $X_D$, $Y_D$ which are respectively supplied to the Calculator 116 to calculate $\overline{\Delta}$ and to the Calculator 118 designed to calculate $\overline{\tan \theta}$ and $1 = (\overline{\tan^2 \theta}/2)$.

Calculating means 118 is connected to receive the decision values $X_D$, $Y_D$ and the measured values $X_m$, $Y_m$ over $n$ bauds and to calculate therefrom an average value for tan $\theta$ and for $1 - (\tan^2 \theta/2)$. These average values are supplied to the multipliers of phase correction device 120 as shown, $\tan \overline{\theta}$ being used as a substitute for sin $\overline{\theta}$ and $1 - (\overline{\tan^2 \theta}/2)$ being used as a substitute for cos $\overline{\theta}$.

Calculating means 116 is connected to receive the decision values $X_D$ $Y_D$ and the measured values $X_m$, $Y_m$ over $n$ bauds and to calculate therefrom an average value for $\overline{\Delta}$. The value $1+\overline{\Delta}$ is a result supplied to the multipliers 124, 126 to provide the signals $X_m''$, $Y_m''$ corrected for amplitude.

The delay 112 is selected to determine the temporal relationship of each particular set of quadrature elements to the averaging period used to correct it. In this particular case the delay 112 is selected to be $n/2$ bauds, so that the elements $X_m$, $Y_m$ corrected for phase always correspond to the middle of the averaging period for calculator 118.

Where the averaging period $n$ for the amplitude correction is greater than the period $n$ for the phase correction, as in the preferred embodiment, the amplitude correction is made later than the phase correction by the amount of a delay 122. In the preferred embodiment the delay of $(m-n)/2$ is provided at delay 122 so that the amplitude correction is performed on the middle element of those averaged at calculator 116.

With $m>n$ the further delay of $(m-n)/2$ is provided at delay 122 before the amplitude correction so that the amplitude correction is performed on the middle element of those averaged at device 124. (It follows therefrom that if the averaging for phase were over a longer period that that for amplitude, i.e. if $n>m$, then the correction for amplitude would be made first, preceeded by a delay of $m/2$ bauds and that between the amplitude and the phase correction there would be a delay of $(n-m)/2$ bauds).

Figure 6:
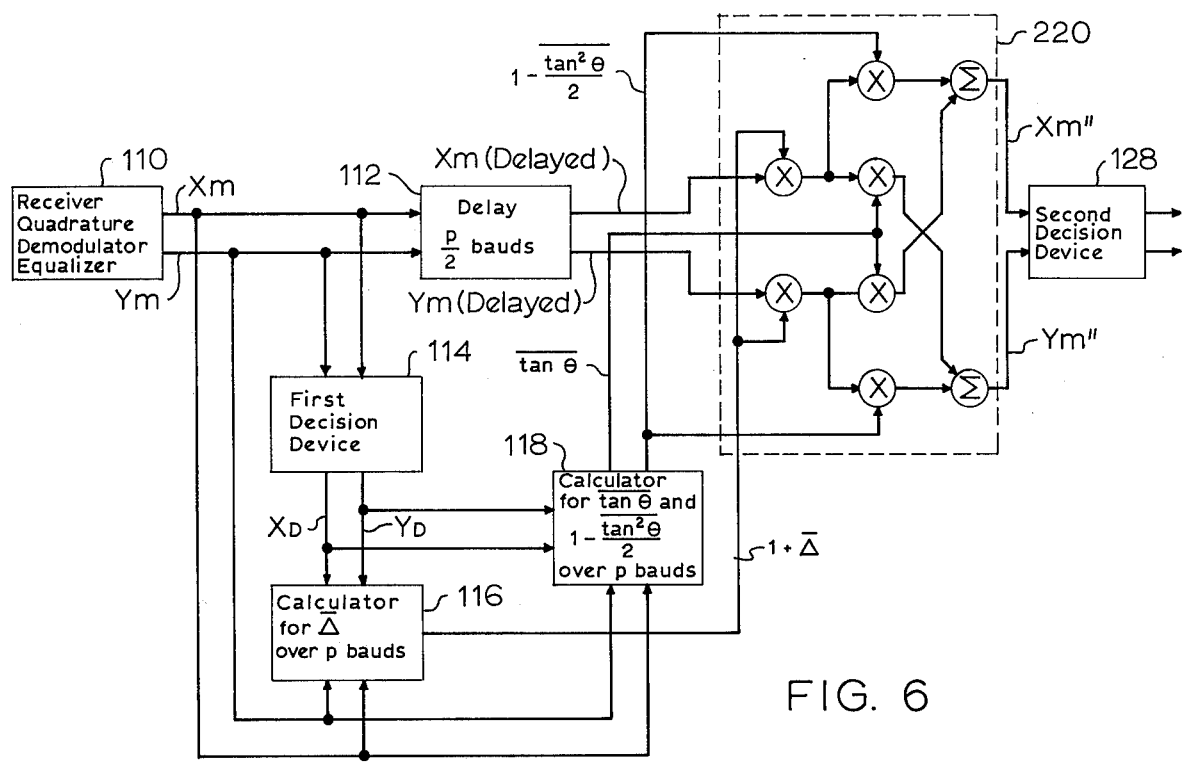
FIG. 6 shows a preferred form of the circuit generally shown in FIG. 2.

FIG. 6 shows a somewhat simplified version of the circuitry of FIG. 5, which has been found to work effectively in practice. In the circuitry of FIG. 6 the connection and operation of the elements 110 to 118 is the same as that described in connection with FIG. 5 except that the averaging period at circuits 116 and 118 is the same (here p bauds). It follows that correction for phase and for amplitude may be performed in the same circuit 220 which has the design of the circuitry of FIG. 4 except that the approximations calculated by calculators 116 and 118 are used instead of sin and cos for the phase corrections. Thus the delay 122 of FIG. 5 is not required in FIG. 6 and the delay 112 is designed to delay the signals passing therethrough by P/2 bauds. The output of circuit 220 is therefore $X_m''$, $Y_m''$ and is supplied to the second decision device.

Although the correction is, in the preferred embodiment, applied in the centre of the averaging period this is merely a preferred approach and with certain channel characteristics or for simplification it may be desirable to use either the phase or amplitude average to correct a signal which is advanced or retarded related to the centre of the averaging period.

In general it should be stated that for small angles the corrected for phase $\sin \bar{\theta}$ may be replaced by $\overline{\sin \theta}$, $\tan \bar{\theta}$ or $\overline{\tan \theta}$, the choice being dictated by the application and the $\theta$ involved.

Similarly $\cos \bar{\theta}$ may in many instances be replaced by $\overline{\cos \theta}$, $1 - (\tan^2 \bar{\theta}/2)$, $1 - (\overline{\tan^2 \theta}/2)$, $\overline{1 - (\tan^2 \theta/2)}$.

It should be noted that the process and circuitry of FIGS. 2, 5 and 6 may be performed iteratively, that is the result of the output of the second decision process may be treated as the subject for comparison with the measured values (as the output of the first decision process is treated in those figures. Thus in the iterative process, the result of the second decision comparison with the measured value to modify the measured value and produce modified quadrature pairs for submission to the third decision process.

This may again be repeated.

Although the specific embodiments of FIG. 5 and FIG. 6 uses delays n/2, (m−n)/2, p/2 before modification of the measured results $X_m$, $Y_m$ (m n, p are even integers) it will be noted that these refer to a preferred form of the invention only. As stated in the introduction, the delay may be such that the signals modified may be before or after the mid point in the averaging interval. The delay may be zero, whereby the averaged results are used to modify the signal occurring at the end of the averaging interval. Thus where the claims refer to delay of the measured signal values, for a number of for a predetermined number of intervals, it is understood that the number of intervals may be zero, that is that there is no delay.

On the other hand, where this application speaks of averaging over a predetermined number of intervals this implies a plurality of such intervals so that real averaging can take place.

A single method of obtaining average values for $1/\bar{g}$, or $\bar{\Delta}$ and $\bar{\theta}$ has been a feature of the description. In that method equal weight has been given to each individual $\theta$ or $\Delta$ or $1/g$ value in forming the corresponding average value. It should now be realized that other methods of performing the averaging operation will be found to work well with the invention. The selection and applicability of such other systems or indeed the method featured herebefore on our description would depend on such factors as the economics of the implementation, which may differ between analogue and digital implementation, and on detailed knowledge of the behaviour of transmission imperfection in the type of transmission channel to which the invention is applied. As one example, the averaging method that may be chosen to give more weight to the results of past preliminary decisions than is given to results from future preliminary decisions or vice versa. As another example, greater weight may be given to results from preliminary decisions that are made closer in time to the reference time positions than to the results of preliminary decisions that are more remote. As a further example, methods of averaging can be employed which give some small weight to the results of preliminary decisions made in the very remote past.

By way of further explanation a correspondence can be taken between methods of averaging and low pass filtering since low pass filters can be characterized in terms of their weighting function on the past which is simply the time reverse of the impulse response of the filter. An example of this form of description for analogue filters is provided in pages 30 to 40 of a 1947 McGraw Hill Book entitled "Theory of Servo Mechanisms" H M James, M V Nichols and R. S. Phillips. The weighting function portrayal of analogue filters given therein is readily extendible to digital filters.

In the case where the averaging or weighting function includes the very remote past as distinct from that in which the average is affected only by preliminary decisions in a finite time interval it is necessary to largely regard delays such as 12 in FIG. 2 and 112, in FIGS. 5 and 6 and 122 in FIG. 5, in terms of their effect on the degree to which results from future preliminary decisions are taken into account in the averages, and to consider the influence of the averaging method for the degree to which results from past preliminary decisions are taken into account.

I claim:
1. Means for correcting for the effects of transmission disturbances on data signal elements which are transmitted in pairs, each said pair being chosen from a predetermined set of pairs of signal values, at regular intervals by means of quadrature modulation and demodulation comprising:
  means for measuring the signal values, as received, of the respective signal elements of sequentially transmitted quadrature pairs,
  means responsive to such measurement of the value of each signal element for making a first decision as to which of the pairs of signal values from said set was transmitted,
  means for comparing measured signal values and decisions values of corresponding signal elements, obtaining from such comparisons, measures of the amplitude and phase errors caused by distances during transmission,
  means for averaging the measures of the amplitude errors over a first predetermined number of intervals to obtain an average amplitude error measure,
  means for averaging the measure of the phase angle errors over a second predetermined number of intervals to obtain an average phase angle error measure,
  means for transmitting said measured signal values over a line,
  means in said last mentioned line for delaying for at least a third predetermined number of intervals, the transmission of the measured signal values,
  means for modifying the amplitude of the pairs of measured signal values delayed by said at least third delay by multiplying the amplitude of said measured signal values by approximately the inverse of said average amplitude error measure;

and means for modifying the phase of the pairs of measured signal values delayed by at least said third delay to correct the phase thereof in the opposite direction to and in approximately the same value as such average phase angle error measure;

means for making, on the basis of such pairs of values modified with regard to both phase and amplitude, a second decision as to which of the pairs of signal values from said set was transmitted.

2. Means as claimed in claim 1 wherein said means for modifying said signals comprises means for modifying the measured signal values $X_m$, $Y_m$ in accord with the relationship:

$$X_m' = X_m \cos \bar{\theta} - Y_m \sin \bar{\theta}$$

$$Y_m' = Y_m \cos \bar{\theta} + X_m \sin \bar{\theta}$$

where $X_m'$ and $Y_m'$ are the pair of signals resulting from modifying the pair of values $X_m$, $Y_m$, in accord with the average phase angle measure, and where $\bar{\theta}$ is the average phase corrections determined from said comparisons.

3. Means for correcting for the effects of transmission disturbances as claimed in claim 1 wherein said first and second predetermined number of intervals are equal.

4. Means for correcting for the effects of transmission disturbances as claimed in claim 3 wherein said third predetermined number of intervals is about one half of either the first or second predetermined number of intervals.

5. Method for correcting for the effects of amplitude and phase jitter in the presence of noise on quadrature signals transmitted over a channel at regular intervals as quadrature pairs of signal elements, each said pair being chosen from a predetermined set of pairs of signal values;

for each pair of elements
obtaining measured values of the quadrature elements received,
on the basis of said measured values making a preliminary decision as to which of the pairs of signal values from said set was transmitted,
calculating, on the basis of the relationship between the measured values and the decision values for corresponding elements, a value representative of the amplitude change occurring on the channel,
calculating, on the basis of the relationship between the measured values and the decision values for corresponding elements, a value representatives of the phase change occurring on the channel,
averaging over a predetermined number of intervals, said amplitude representatives values,
averaging over a predetermined number of intervals said phase measure,
modifying the amplitude of the pairs of said measured values by multiplying the amplitude of said measured signal values by approximately the inverse of said average amplitude change measure,
and modifying the phase of the pairs of signal values to correct the phase thereof in the opposite direction to and in approximately the same value as such average phase change measure,
making on the basis of said pairs of values modified both as to amplitude and phase a second decision as to the values transmitted.

6. Method as claimed in claim 5 wherein said measured values are delayed before such modifying for a predetermined number of intervals.

7. Method of correcting for the effects of transmission disturbances as claimed in claim 6 wherein said amplitude representative values and said phase measure are averaged over the same predetermined number of intervals.

8. Method of correcting for the effects of transmission disturbances as claimed in claim 7 wherein said measured values are delayed for about one half the number of intervals used for averaging said amplitude values and said phase measure.

9. Means for correcting for the effects of transmission disturbances on data signal elements which are transmitted in pairs, each said pair being chosen from a predetermined set of pairs of signal values, at regular intervals by means of quadrature modulation and demodulation comprising:

means for measuring the signal values, as received, of the respective signal elements of sequentially transmitted quadrature pairs,
means responsive to such measurement of the value of each signal element for making a first decision as to which of the pairs of signal values from said set was transmitted
means for comparing measured signal values and decision values of corresponding signal elements, obtaining from such comparisons, measures of the amplitude and phase errors caused by disturbances during transmission,
means for averaging the measures of the amplitude errors over a plurality of intervals to obtain an average amplitude error measure,
means for averaging the measures of the phase angle error over a plurality of intervals to obtain an average phase angle error measure,
means for transmitting said measured signal values over a line,
means for modifying the amplitude of the pairs of measured signal values on said line by multiplying the amplitide of said measured signal values by approximately the inverse of said average amplitude error measure;
means for modifying the phase of the pairs of measured signal values to correct the phase thereof in the opposite direction to and in approximately the same value as such average phase angle error measure;
and means for making, on the basis of such pairs of values modified with regard to both phase and amplitude a second decision as to which of the pairs of signal values from said set was transmitted.

10. Method of correcting for the effects of amplitude and phase jitter in the presence of noise on quadrature signals transmitted over a channel at regular intervals as quadrature pairs of signal elements, for each pair of elements,
obtaining measured values of the quadrature elements received,
on the basis of said measured values making a preliminary decision as to the values of the corresponding transmitted quadrature elements,
calculating, on the basis of the relationship between the measured values and the decision values for corresponding elements, a value representing the amplitude change occurring on the channel, calculating, on the basis of the relationship between the measured values and the decision values for corresponding elements, a value representative of the phase change occurring on the channel, averaging over a plurality of intervals, said amplitude representative values, averaging over a plurality of intervals, said phase change measure, modifying the amplitude and the phase of said measured values in accord with the results of said averaging process to approximately compensate for the amplitude change occurring on the channel and to approximately compensate for the phase change occurring on the channel.

* * * * *